C. SENFER.
VEHICLE.
APPLICATION FILED FEB. 13, 1912.
1,164,228.
Patented Dec. 14, 1915.
2 SHEETS—SHEET 1.
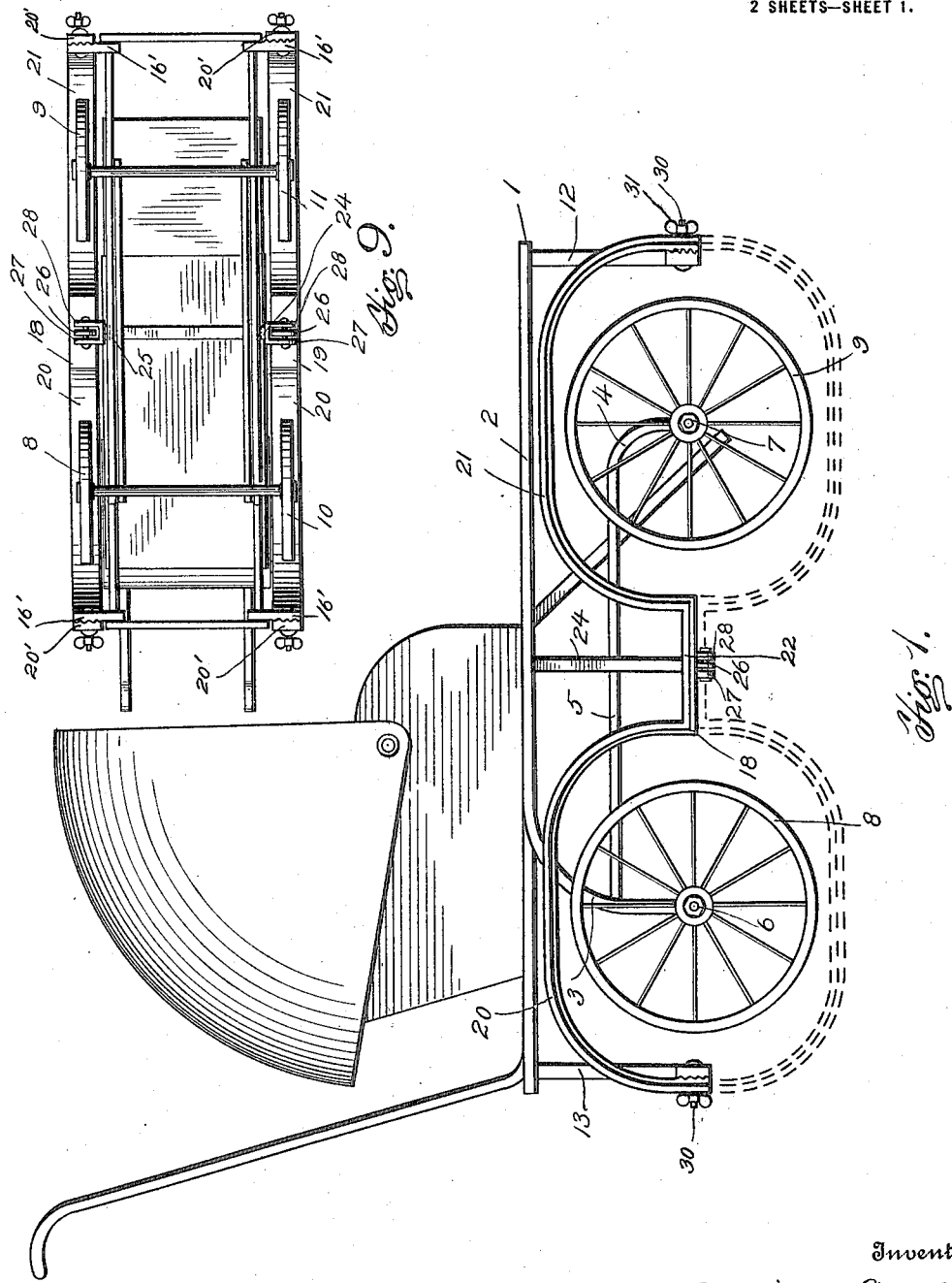
Witnesses
M. P. McKee
L. E. Bobys
Inventor
Charles Senfer
By Alex. J. Wedderburn, Jr.
Attorney C. SENFER.
VEHICLE.
APPLICATION FILED FEB. 13, 1912.
1,164,228.
Patented Dec. 14, 1915.
2 SHEETS—SHEET 2.
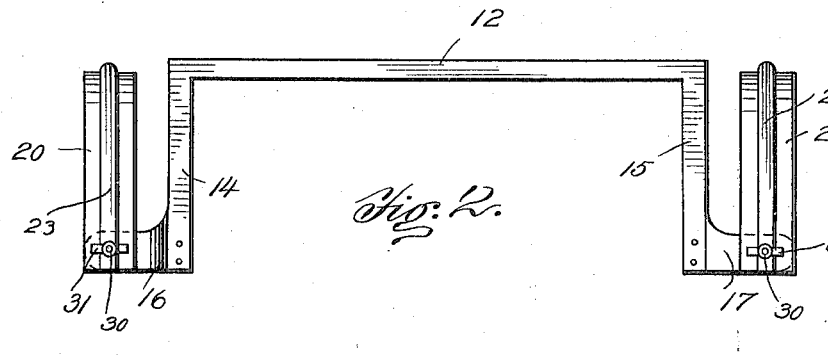
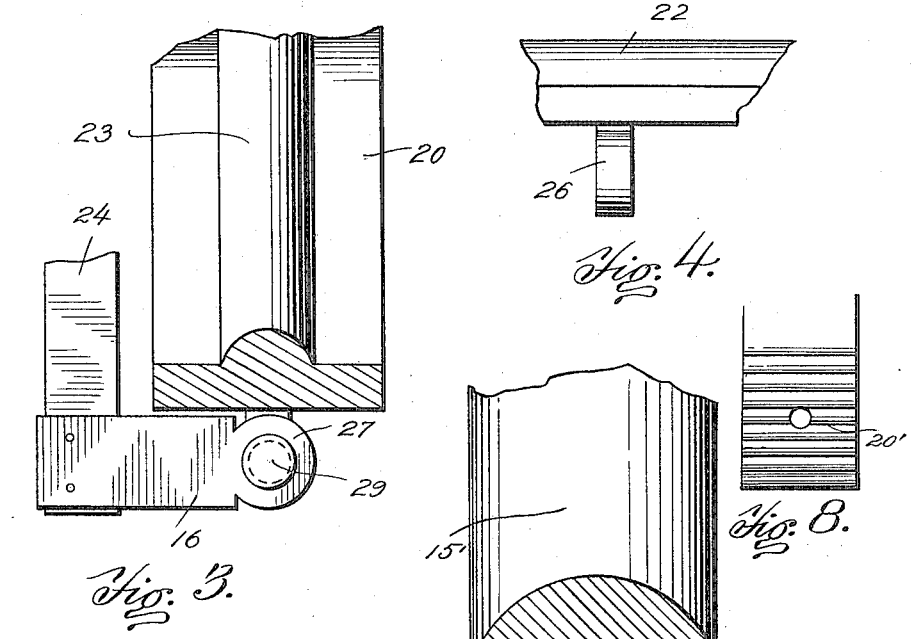

UNITED STATES PATENT OFFICE.

CHARLES SENFER, OF CLEVELAND, OHIO.

VEHICLE.

1,164,228.  Specification of Letters Patent.  Patented Dec. 14, 1915.

Application filed February 13, 1912. Serial No. 677,321.

*To all whom it may concern:*

Be it known that I, CHARLES SENFER, a citizen of the United States, residing at Cleveland, in the county of Cuyahoga and State of Ohio, have invented certain new and useful Improvements in Vehicles, of which the following is a specification.

This invention relates to improvements in vehicles.

The object of my invention is to provide in a vehicle a combined mud guard and sled runner which will be movable from one position to another with ease to be effective to present a surface against which mud can be splashed so as to avoid defacing the sides of the vehicle, and to have engagement with snow or ice for the purpose of enabling the vehicle to be moved.

With the above and other objects in view, my invention consists in the combination, arrangement and details of construction shown in the drawings and then more particularly pointed out in the appended claims.

Similar reference characters designate similar parts throughout the respective views of the drawings, wherein, Figure 1 is a side elevation of my invention, Fig. 2 is a detail end elevation thereof, Fig. 3 is a fragmental detail view of the hinge support for the mud guard, an end elevation being shown, Fig. 4 is a fragmental detail view of the combined mud guard and sled runner showing the pintle receiving ring, Fig. 5 is a bottom plan view of the hinge support shown in Fig. 3, Fig. 6 is a detail fragmental view of a modified form of my invention, Fig. 7 is a fragmental detail view of the corrugated surface, of the sled runner holder, Fig. 8 is a fragmental detail view of a corrugated surface coöperating with that shown in Fig. 7, and Fig. 9 is a bottom plan view of the invention.

Reference being made to the drawings, 1 indicates a vehicle of any desired construction, the form shown in the drawings being a go-cart. It will be noticed that the principle of my invention can be used indiscriminately upon vehicles intended for light or heavy transportation.

2 indicates the top frame of the vehicle, which may be of any suitable construction, and for the go-cart 1 includes a depending axle support 3 and an axle support 4 forming part of the horizontally extending member 5 connected to the axle support 3. Upon the axles 6 and 7 are mounted the wheels designated 8, 9, 10 and 11 respectively by means of which the go-cart is moved when the sled runner is not in use. Secured at each end of the top frame 2 by any suitable means are the supporting members 12 and 13 respectively. The construction of these members being the same the description will be limited to one.

Each of the supporting members 12 is composed of a longitudinal portion secured transversely underneath the top frame 2, being preferably equal in length to the width of the top frame, and each longitudinally extending portion is formed with right angular depending offsets 14 and 15 respectively, terminating in right angular outwardly extending portions 16 and 17. It will be noticed that the outwardly extending portions 16 and 17 protrude from the sides of the vehicle in order that the combined mud guard and sled runner mounted between the similar portions 14 or 15 at each side of the vehicle, may be spaced from the body of the vehicle. The projecting ends of the portions 16 and 17 are formed at their outer faces with corrugated surfaces 16' with which the corrugated under surfaces 20' formed upon the free ends of the members 20 and 21' have rigid engagement to be clamped in position by the thumb nuts 31 about to be described.

The mud guard is composed of a longitudinal member substantially equal in length to that of the vehicle upon which it is mounted and is formed with oppositely arranged arch-shaped portions arranged to form a sled runner for said vehicle. The mud guards are designated respectively 18 and 19 and the arch-shaped portions formed upon each are designated 20 and 21 respectively. Centrally of each of the mud guards is formed a horizontal portion 22 spanning the distance between two of the arch-shaped portions. Disposed from end to end of each of the members 18 and 19 substantially intermediate of its edges are substantially semi-cylindrical upraised members designated 23. These upraised portions take the form of members 20 and 21 in order that they may have the desirable sliding contact with the ice over which it is desired to move the vehicle. Centrally of the top frame 2 of the vehicle 1 and at diametrically opposite edges thereof are mounted the depending posts 24 and 25 respectively upon which the hinge support for said members are laterally mounted. Each of said posts 24 and 25 is formed with two intermediate reduced extensions forming the pintle receiving rings 27 and 28, said rings being of equal diameter with the oppositely arranged ring 26 formed upon the horizontal portion 22 of each of said members, so that when the rings 26, 27, and 28 are disposed in alinement the pintle 29 may be passed therethrough to enable said horizontal portions to have pivotal movement relatively to the side of the vehicle 1.

Tapped through the outer end of each of the right angular portions 16 and 17 formed upon the members 12 and 13 and through the free corrugated ends of each of the arch shaped members 20 and 21 formed upon the members 18 and 19 respectively are screw bolts 30 upon the outer end of each of which is mounted a thumb nut 31 arranged to cause the head of each bolt to tighten the adjacent corrugated portions of the arch-shaped members 20 and 21 against the corrugated surfaces of said right angular portions. It will be seen that said members 18 and 19 may be moved to position to serve as a mud guard or to a position where they are adapted to serve as sled runners to move the vehicle over ice, snow, or the like. When it is intended to hold said members in their set positions the thumb nut 31 will be tightened in the manner described to tighten the free ends of each of said members to prevent the movement thereof. When said thumb nuts are loosened the members 18 and 19 may be turned on the pintles 29 to occupy the dotted line position clearly shown in Fig. 1, and in use it will be expedient to use a jack to raise the wheels in a higher plane to enable the portions 20 and 21 formed upon said members to engage the snow or ice with the least friction. When moved to the position indicated in dotted lines in Fig. 1 the runners support the vehicle independently of its wheels, said wheels being suspended as shown, and the arch-shaped members will be held in rigid operative position by tightening the thumb nuts 31 engaging the screws 30. It will also be noticed that the members 18 and 19 will be substantially of greater width than the wheel, and it will be possible to place the wheels intermediate the edges thereof so that mud may be splashed against the surface of each of the arch-shaped members when the wheels are in motion.

From the above it will be observed that the members 12 and 13 disposed at the ends of the top frame 2 of the vehicle 1 tend to brace the members 18 and 19 at points where the strain will necessarily be heaviest and to avoid this the intermediate posts 24 and 25 serve to take up part of the weight of said members whereby the equilibrium of the vehicle will be the same whether the wheels or the sled runners have engagement with the surface of the ground to move the vehicle.

Numerous modifications may be resorted to in practice without departing in principle from the invention disclosed.

I claim and desire to secure by Letters Patent:

1. A device consisting of a pair of pivoted members supports upon which said members are pivoted at their ends, each of said members consisting of arch-shaped spaced-apart sections, and straight connecting portions integral with said sections, and runners formed upon each of said arch-shaped sections.

2. In combination with a wagon frame and wheels mounted thereon a series of depending supports carried by said frame, two disposed at the ends of said frame and one disposed intermediate thereof, two longitudinally extending members pivoted at their ends upon said end supports to swing laterally of said frame, each of said members consisting of two spaced apart curvilinear guards adapted to occupy pivotal positions above and below said wheels and means of pivotal attachment of said members upon said intermediate supports, said means disposed substantially in line with the axles of said wheels.

In testimony whereof I affix my signature in presence of two witnesses.

CHARLES SENFER.

Witnesses:
FRANK H. VANDEWEIL,
WM. C. LAMB.

Copies of this patent may be obtained for five cents each, by addressing the "Commissioner of Patents. Washington, D. C."

It is hereby certified that in the grant, in the heading to the drawings, and in the printed specification of Letters Patent No. 1,164,228, granted December 14, 1915, for an improvement in "Vehicles," the name of the patentee was erroneously written and printed as Charles Senfer, whereas said name should have been written and printed as *Charles Seufer;* and that the said Letters Patent should be read with this correction therein that the same may conform to the record of the case in the Patent Office.

Signed and sealed this 18th day of April, A. D., 1916.

[SEAL.]

R. F. WHITEHEAD,
*Acting Commissioner of Patents.*

Cl. 21—96.